(12) United States Patent
Ramasamy et al.

(10) Patent No.: US 11,345,843 B2
(45) Date of Patent: May 31, 2022

(54) METHODS FOR PRODUCING AN EMULSIFIER SUITABLE FOR USE IN AN EMULSION DRILLING FLUID

(71) Applicant: Saudi Arabian Oil Company, Dhahran (SA)

(72) Inventors: Jothibasu Ramasamy, Dhahran (SA); Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/034,170

(22) Filed: Sep. 28, 2020

(65) Prior Publication Data

US 2022/0098466 A1   Mar. 31, 2022

(51) Int. Cl.
*C09K 8/28* (2006.01)
*C11C 3/04* (2006.01)
*C09K 8/36* (2006.01)

(52) U.S. Cl.
CPC .................. *C09K 8/28* (2013.01); *C09K 8/36* (2013.01); *C11C 3/04* (2013.01)

(58) Field of Classification Search
None
See application file for complete search history.

(56) References Cited

U.S. PATENT DOCUMENTS

| | | | |
|---|---|---|---|
| 2,452,724 A | 11/1948 | Bradshaw | |
| 3,396,105 A | 8/1968 | Burdyn et al. | |
| 3,558,679 A | 1/1971 | Queval et al. | |
| 4,508,628 A | 4/1985 | Walker et al. | |
| 5,797,456 A * | 8/1998 | Mokadam | C09K 8/52 166/307 |
| 10,385,254 B2 * | 8/2019 | Ramasamy | C09K 8/035 |
| 10,808,161 B2 * | 10/2020 | Ramasamy | B01F 3/0811 |
| 2012/0071369 A1 | 3/2012 | Amanullah | |
| 2013/0210630 A1 | 8/2013 | Musa et al. | |
| 2017/0190984 A1 * | 7/2017 | Koh | E21B 43/24 |
| 2019/0031941 A1 | 1/2019 | Chatterji et al. | |
| 2019/0144732 A1 | 5/2019 | Ramasamy et al. | |

FOREIGN PATENT DOCUMENTS

EP   2110429 A1   10/2009

OTHER PUBLICATIONS

International Search Report and Written Opinion dated Jun. 25, 2021 pertaining to International application No. PCT/US2021/017335 filed Feb. 10, 2021, 14 pages.

* cited by examiner

*Primary Examiner* — John J Figueroa
(74) *Attorney, Agent, or Firm* — Dinsmore & Shohl LLP

(57) ABSTRACT

According to one or more embodiments of the present disclosure, a method for producing an emulsifier suitable for use in an emulsion drilling fluid may comprise esterifying a processed vegetable oil to produce a first mixture comprising fatty acid alkyl esters. The processed vegetable oil may comprise less than 1 wt. % of compounds having an atmospheric boiling point less than or equal to 150° C. The method may further comprise removing at least 99 wt. % of each of glycerol, water, and short-chain alcohols having a main chain of less than or equal to 12 carbon atoms from the first mixture to produce a modified mixture, and hydrolyzing the fatty acid alkyl esters of the modified mixture with a base to produce the emulsifier comprising at least one salt of a fatty acid. Emulsion drilling fluids comprising the emulsifier and methods of producing emulsion drilling fluids are also disclosed.

18 Claims, No Drawings

METHODS FOR PRODUCING AN EMULSIFIER SUITABLE FOR USE IN AN EMULSION DRILLING FLUID

BACKGROUND

Field

The present disclosure relates to natural resource well drilling and, more specifically, to emulsion drilling fluids and methods for making emulsifiers suitable for emulsion drilling fluids.

Technical Background

Drilling operations, such as drilling new wellbores for hydrocarbon extraction, may include the practice of continuously circulating a drilling fluid (sometimes known as a drilling mud) through the wellbore during the operation. The drilling fluid may be pumped into the drill pipe to the bottom of the borehole, where the drilling fluid then flows upwardly through an annular space between the wellbore wall and the drill pipe and finally returns to the surface and flows out of the wellbore, where it may be recovered. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore. Emulsion drilling fluids are commonly used during these drilling operations, particularly in high pressure and high temperature drilling operations. Emulsion drilling fluids, which comprise an aqueous phase and a non-aqueous phase, typically use an emulsifier to facilitate the formation of the emulsion and reduce the interfacial tension between the two phases. However, many emulsifiers have limitations in their applications. For example, some emulsifiers are poorly biodegradable, toxic, or not "ecologically-friendly" and, as such, have restricted applications for ecologically sensitive environments.

SUMMARY

Accordingly, there is an ongoing need for improved emulsifiers suitable for use in emulsion drilling fluids. As such, the emulsifiers of the present disclosure are synthesized from processed vegetable oil and, as a result, may be sourced from readily available feedstock materials that are not commonly recycled. For example, processed vegetable oils may include those that are left over from food preparation, such as frying, and may be used in the embodiments presently described. Such materials are relatively inexpensive as feedstock materials for the production of emulsifiers. Additionally, in some embodiments, utilizing processed vegetable oils such as those left over from cooking may even generate greater yields of emulsifier as compared with emulsifiers prepared from unprocessed vegetable oils. Moreover, the resulting emulsifiers, which are salts of the fatty acids present in the processed vegetable oil, are more ecologically-friendly when compared to typical emulsifiers.

According to one or more embodiments of the present disclosure, a method for producing an emulsifier suitable for use in an emulsion drilling fluid may comprise esterifying a processed vegetable oil to produce a first mixture comprising fatty acid alkyl esters. The processed vegetable oil may comprise less than 1 weight percent (wt. %) of compounds having an atmospheric boiling point less than or equal to 150 degrees Celsius (° C.). The method may further comprise removing at least 99 wt. % of each of glycerol, water, and short-chain alcohols having a main chain of less than or equal to 12 carbon atoms from the first mixture to produce a modified mixture, and hydrolyzing the fatty acid alkyl esters of the modified mixture with a base to produce the emulsifier comprising at least one salt of a fatty acid.

According to one or more additional embodiments of the present disclosure, a method for producing an emulsion drilling fluid may comprise esterifying a processed vegetable oil to produce a first mixture comprising fatty acid alkyl esters. The processed vegetable oil may comprise less than 1 wt. % of compounds having an atmospheric boiling point less than or equal to 150° C. The method may further comprise removing at least 99 wt. % of each of glycerol, water, and short-chain alcohols having a main chain of less than or equal to 12 carbon atoms from the first mixture to produce a modified mixture, and hydrolyzing the fatty acid alkyl esters of the modified mixture with a base to produce an emulsifier comprising at least one salt of a fatty acid, and mixing the emulsifier with a base drilling fluid comprising an aqueous phase and a non-aqueous phase to produce the emulsion drilling fluid.

According to one or more additional embodiments of the present disclosure, an emulsion drilling fluid may comprise an aqueous phase comprising an aqueous base fluid in an amount of from 10 wt. % to 90 wt. %, a non-aqueous phase comprising a non-aqueous base fluid in an amount of from 10 wt. % to 90 wt. %, and an emulsifier in an amount of from 0.1 wt. % to 10 wt. %, based on the total weight of the emulsion drilling fluid. The emulsifier may be produced by a method comprising esterifying a processed vegetable oil to produce a first mixture comprising fatty acid alkyl esters. The processed vegetable oil may comprise less than 1 wt. % of compounds having an atmospheric boiling point less than or equal to 150° C. The method may further comprise removing at least 99 wt. % of each of glycerol, water, and short-chain alcohols having a main chain of less than or equal to 12 carbon atoms from the first mixture to produce a modified mixture, and hydrolyzing the fatty acid alkyl esters of the modified mixture with a base to produce the emulsifier comprising at least one salt of a fatty acid.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

DETAILED DESCRIPTION

The present disclosure is directed to emulsion drilling fluids and methods for making emulsifiers suitable for emulsion drilling fluids. Such drilling fluids may be used in the drilling of a subterranean formation. A subterranean formation is the fundamental unit of lithostratigraphy. As used in the present disclosure, the term "subterranean formation" may refer to a body of rock that is sufficiently distinctive from the surrounding rock bodies such that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions contain hydrocarbons and others do not. To recover hydrocarbons from the hydrocarbon regions of the subterranean formation, production wells are drilled. The wellbore of production wells may serve to connect hydrocarbon-containing regions of the subterranean formation to the surface and enable hydrocarbons to travel from the subterranean formation to the surface. As used in the present disclosure, the term "wellbore" may refer to the drilled hole or borehole, including the openhole or uncased portion, of a well.

To drill a subterranean well, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the subterranean well. Drilling fluids may lift cuttings away from the bottom of the subterranean well when recirculated back to the surface. Drilling fluids may serve a number of additional functions as well. For example, drilling fluids may also provide hydrostatic pressure in the subterranean well sufficient to support the sidewalls of the subterranean well. This hydrostatic pressure may prevent the sidewalls from collapsing and caving in on the drill string as well as prevent fluids present in the subterranean formation from flowing into the subterranean well during drilling.

As stated previously, the drilling fluid of the present disclosure may be characterized as an emulsion. As used in the present disclosure, the term "emulsion" (also referred to as an emulsion drilling fluid) refers to a drilling fluid comprising at least two immiscible phases: a dispersed phase and a continuous phase. An emulsion may be characterized as an oil-in-water, or direct, emulsion comprising a non-aqueous dispersed phase and an aqueous continuous phase, or a water-in-oil, or invert, emulsion comprising an aqueous dispersed phase and a non-aqueous continuous phase. As used in the present disclosure, the term "aqueous" refers to fluids or solutions comprising water as the major constituent. The term "non-aqueous" refers to fluids or solutions comprising a major constituent that is immiscible with water. Accordingly, the drilling fluid of the present disclosure may comprise an aqueous phase comprising an aqueous base fluid and a non-aqueous phase comprising a non-aqueous base fluid.

The aqueous base fluid may comprise fresh water, salt water, brine, municipal water, formation water, produced water, well water, filtered water, distilled water, seawater, or combinations of these. Without being bound by any particular theory, it is believed aqueous base fluids incorporating salt or other organic compounds, such as brine, may be suitable to control the density of the drilling fluid. For example, increasing the saturation of the aqueous base fluid by increasing the concentration of salt or other organic compounds in the aqueous base fluid may increase the density of the drilling fluid. Suitable salts may comprise alkali metal chlorides, hydroxides, carboxylates, or combinations of these. For example, the aqueous base fluid may comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these. The aqueous base fluid may comprise a majority (that is, greater than 50 wt. %) of the aqueous phase. For example, the aqueous base fluid may comprise at least 60 wt. %, at least 70 wt. %, at least 80 wt. %, at least 90 wt. %, at least 95 wt. %, or at least 99 wt. % of the aqueous phase.

The non-aqueous base fluid may comprise any non-aqueous fluid, such as an oil, or non-aqueous solution, such as an oil and one or more organic or inorganic compounds dissolved in the oil or otherwise completely miscible with the oil. Suitable oils may comprise one or more crude oils or crude oil derivatives, such as gasoline, diesel, kerosene, bunker fuel, jet fuel, naptha, mineral oil, or combinations of these. In embodiments, the non-aqueous base fluid may comprise a synthetic oil. As used in the present disclosure, the term "synthetic oil" refers to crude oil derivatives that have been chemically treated, altered, or refined to enhance certain chemical or physical properties. While crude oil derivatives may typically comprise several classes (for example, alkane, aromatic, sulfur-bearing, or nitrogen-bearing) of thousands of individual compounds, a synthetic oil may comprise one class of only tens of individual compounds (for example, ester compounds in a $C_{8-14}$ range). Suitable synthetic oils may comprise linear alpha olefins, isomerized olefins, poly alpha olefins, linear alkyl benzenes, vegetable and hydrocarbon-derived ester compounds, or combinations of these. The non-aqueous base fluid may comprise a majority (that is, greater than 50 wt. %) of the non-aqueous phase. For example, the non-aqueous base fluid may comprise at least 60 wt. %, at least 70 wt. %, at least 80 wt. %, at least 90 wt. %, at least 95 wt. %, or at least 99 wt. % of the non-aqueous phase.

The drilling fluid of the present disclosure may comprise an aqueous phase comprising an aqueous base fluid in an amount of from 5 weight percent (wt. %) to 95 wt. %, based on the total weight of the drilling fluid. For example, in embodiments wherein the drilling fluid comprises a direct emulsion, the drilling fluid may comprise an aqueous continuous phase comprising an aqueous base fluid in an amount of from 50 wt. % to 95 wt. %, from 50 wt. % to 80 wt. %, from 50 wt. % to 70 wt. %, from 50 wt. % to 60 wt. %, from 60 wt. % to 95 wt. %, from 60 wt. % to 80 wt. %, from 60 wt. % to 70 wt. %, from 70 wt. % to 95 wt. %, from 70 wt. % to 80 wt. %, or from 80 wt. % to 95 wt. %, based on the total weight of the drilling fluid. Conversely, in embodiments wherein the drilling fluid comprises an invert emulsion, the drilling fluid may comprise an aqueous dispersed phase comprising an aqueous base fluid in an amount of from 5 wt. % to 50 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 50 wt. %, from 10 wt. % to 40 wt. %, from 10 wt. % to 30 wt. %, from 10 wt. % to 20 wt. %, from 20 wt. % to 50 wt. %, from 20 wt. % to 40 wt. %, from 20 wt. % to 30 wt. %, from 30 wt. % to 50 wt. %, from 30 wt. % to 40 wt. %, or from 40 wt. % to 50 wt. %, based on the total weight of the drilling fluid.

The drilling fluid of the present disclosure may comprise a non-aqueous phase comprising a non-aqueous base fluid in an amount of from 5 wt. % to 95 wt. %, based on the total weight of the drilling fluid. For example, in embodiments wherein the drilling fluid comprises an invert emulsion, the drilling fluid may comprise a non-aqueous continuous phase comprising a non-aqueous base fluid in an amount of from 50 wt. % to 95 wt. %, from 50 wt. % to 80 wt. %, from 50 wt. % to 70 wt. %, from 50 wt. % to 60 wt. %, from 60 wt. % to 95 wt. %, from 60 wt. % to 80 wt. %, from 60 wt. % to 70 wt. %, from 70 wt. % to 95 wt. %, from 70 wt. % to 80 wt. %, or from 80 wt. % to 95 wt. %, based on the total weight of the drilling fluid. Conversely, in embodiments wherein the drilling fluid comprises a direct emulsion, the drilling fluid may comprise a non-aqueous dispersed phase comprising a non-aqueous base fluid in an amount of from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 50 wt. %, from 10 wt. % to 40 wt. %, from 10 wt. % to 30 wt. %, from 10 wt. % to 20 wt. %, from 20 wt. % to 50 wt. %, from 20 wt. % to 40 wt. %, from 20 wt. % to 30 wt. %, from 30 wt. % to 50 wt. %, from 30 wt. % to 40 wt. %, or from 40 wt. % to 50 wt. %, based on the total weight of the drilling fluid.

As stated previously, the drilling fluids of the present disclosure may comprise an emulsifier. As used in the present disclosure, the term "emulsifier" refers to any compound suitable to facilitate the formation of an emulsion and reduce the interfacial tension between the dispersed phase and the continuous phase of the emulsion. Conventional emulsifiers include surfactants, detergents, lignosulfonates, lignitic compounds, and materials derived from tall oil fatty acids. However, the emulsifier of the present disclosure generally comprises the salts of fatty acids present in vegetable oil.

In particular, the emulsifier of the present disclosure may be derived from a processed vegetable oil. As used in the present disclosure, the term "processed vegetable oil" refers to a vegetable oil substantially free of compounds having an atmospheric boiling point less than or equal to 150° C. For example, a processed vegetable oil may be substantially free of compounds having an atmospheric boiling point less than or equal to 160° C., less than or equal to 170° C., less than or equal to 180° C., less than or equal to 190° C., or less than or equal to 200° C. As used in the present disclosure, the term "substantially free" of a compound refers to a particular mixture, such as the processed vegetable oil, that comprises less than 1 wt. % of the material. For example, the processed vegetable oil, which may be substantially free of compounds having an atmospheric boiling point less than or equal to 150° C., may comprise less than 1 wt. %, less than 0.9 wt. %, less than 0.8 wt. %, less than 0.7 wt. %, less than 0.6 wt. %, less than 0.5 wt. %, less than 0.4 wt. %, less than 0.3 wt. %, less than 0.2 wt. %, or less than 0.1 wt. % of compounds having an atmospheric boiling point less than or equal to 150° C., based on the total weight of the processed vegetable oil.

In one or more embodiments, the processed vegetable oil may be a previously unprocessed vegetable oil that has been used in a cooking or food preparation process. Cooking or food preparation processes that utilize vegetable oil may typically be carried out at temperatures of from 150° C. to 200° C. In such embodiments, the processed vegetable oil of the present disclosure may be used as a sustainable, inexpensive source of vegetable oil, which may otherwise be discarded as food preparation waste. Additionally, cooking or food preparation processes may result in the alteration of the composition of the vegetable oil. For example, frying may result in an increase of saturated fatty acids as well as a corresponding decrease in unsaturated fatty acids. Without being bound by any particular theory, it is believed that food preparation processes, such as the frying of potatoes, may result in the transfer of free fatty acids from the food to the oil and, as a result, increase the content of such fatty acids. Additionally, as food preparation processes that vegetable oil may typically be carried out at temperatures of from 150° C. to 200° C., some free fatty acids may volatilize and evaporate.

In one or more embodiments, the processed vegetable oil may be substantially free of volatile content. As used in the present disclosure, the term "volatile content" refers to non-fatty acid compounds present in the vegetable oil, such as 2,4-decadienal, 1-octen-3-ol, 2-penten-1-ol, nonanal, hexanal, heptanal, 2-4,decadieanal, or combinations of these. When the vegetable oil is heated, such as to a temperature greater than or equal to 150° C., the volatiles may evaporate and result in a processed vegetable oil that is substantially free of the volatiles. Accordingly, a processed vegetable oil may refer to a vegetable oil that comprises less than 1 wt. %, less than 0.9 wt. %, less than 0.8 wt. %, less than 0.7 wt. %, less than 0.6 wt. %, less than 0.5 wt. %, less than 0.4 wt. %, less than 0.3 wt. %, less than 0.2 wt. %, or less than 0.1 wt. % of 2,4-decadienal, 1-octen-3-ol, 2-penten-1-ol, nonanal, hexanal, heptanal, and 2-4,decadieanal, based on the total weight of the processed vegetable oil. Without being bound by any particular theory, it is believed that these volatiles may interact with both the catalyst used for esterification as well as the aqueous hydroxide solution used for hydrolyzation, which are described subsequently. As a result, the yield of alkyl esters and, subsequently, the yield of emulsifier may be reduced when the processed vegetable oil comprises greater than 1 wt. % of these volatiles. That is, processed vegetable oil may result in a greater yield of emulsifier when compared to pure or unprocessed vegetable oil.

As mentioned previously, in some embodiments the processed vegetable oil is a vegetable oil that has been used in a cooking or food preparation process. Commonly used vegetable oils that may be used in a cooking or food preparation may comprise olive oil, palm oil, sunflower oil, corn oil, peanut oil, or combinations of these. Accordingly, the processed vegetable oil of the present disclosure may comprise olive oil, palm oil, sunflower oil, corn oil, peanut oil, or combinations of these. As these vegetable oils generally comprise a mixture of different types of free fatty acids, the processed vegetable oil of the present disclosure may comprise a mixture of saturated, mono unsaturated, poly unsaturated, omega 3, omega 6, and omega 9 free fatty acids, depending on the vegetable oils present in the processed vegetable oil.

Before producing the emulsifier of the present disclosure, impurities may be removed from the processed vegetable oil. The impurities, such as food residue, may reduce the functional capability of the processed vegetable oil. The impurities may be removed from the processed vegetable oil by filtering the processed vegetable oil with a pressure gradient of from 5 pounds per square inch (psi) to 10 psi. For example, the processed vegetable oil may be filtered with a pressure gradient of from 5 psi to 9 psi, from 5 psi to 8 psi, from 5 psi to 7 psi, from 5 psi to 6 psi, from 6 psi to 10 psi, from 6 psi to 9 psi, from 6 psi to 8 psi, from 6 psi to 7 psi, from 7 psi to 10 psi, from 7 psi to 9 psi, from 7 psi to 8 psi, from 8 psi to 10 psi, from 8 psi to 9 psi, or from 9 psi to 10 psi. The processed vegetable oil may be filtered through a filter paper that has a pore size less than or equal to 25 microns (µm). For example, the processed vegetable oil may be filtered through a "Grade 1" filter paper, a "Grade 2" filter paper, a "Grade 3" filter paper, a "Grade 4" filter paper, or a "Grade 602 h" filter paper. The pressured filtration of the processed vegetable oil through a filter paper may remove impurities, such as food residue, which may be present in the processed vegetable oil. It should be understood that alternative filtration methods, such as the use of filtration media or adsorbents that are capable of removing impurities and excess water from the processed vegetable oil, may be used as alternatives or in addition to the pressured filtration of the processed vegetable oil. For example, impurities may be removed from the processed vegetable oil via a multi-cell filtration apparatus that utilizes various filtration methods.

After any impurities have been removed, the processed vegetable oil may be esterified to produce a first mixture comprising fatty acid alkyl esters and glycerol. In particular, the processed vegetable oil may be esterified with a short-chain alcohol. As used in the present disclosure, the term "short-chain alcohol" refers to alcohols having a main chain or "backbone" of less than or equal to 12 carbon atoms, excluding branched sidechains. In particular, the short-chain alcohols described herein may comprise an organic compound comprising at least one hydroxyl functional group bound to an aliphatic hydrocarbon comprising a main chain or "backbone" of less than or equal to 12 carbon atoms, excluding branched sidechains. For example, ethanol is a short-chain alcohol that comprises a single hydroxyl functional group bound to an aliphatic hydrocarbon comprising a main chain of 2 carbon atoms. Short-chain alcohols may comprise one or more hydroxyl functional groups bound to an aliphatic hydrocarbon that is saturated or unsaturated, straight chain (unbranched) or branched, unsubstituted or heteroatom-substituted, or combinations of these. Suitable short-chain alcohols comprise methanol, ethanol, propanol, butanol, and combinations of these. The processed vegetable oil may be esterified with a short-chain alcohol in the presence of a catalyst. Suitable catalysts comprise sodium hydroxide, potassium hydroxide, sodium alkoxide, potassium alkoxide, and combinations of these. The esterification of the processed vegetable oil with a short-chain alcohol in the presence of a catalyst may produce a first mixture comprising glycerol and alkyl esters corresponding to the fatty acids present in the processed vegetable oil. For example, a processed vegetable oil comprising triglycerides of palmitic acid may be esterified with methanol in the presence of sodium hydroxide to produce a mixture comprising glycerol and methyl esters of palmitic acid. To do so, a volume of methanol and a mass of sodium hydroxide may be mixed in a dry condition and then added to the processed vegetable oil. The mixture may then be stirred for a time sufficient to complete the interactions between the components.

After esterification, one or more of glycerol, water, and short-chained alcohols may be removed from the first mixture to form a modified mixture. The removal of these respective components may be in any order, and any two or more of these components may be removed in a single step.

In some embodiments, glycerol may be removed from the first mixture to produce a second mixture. For example, to remove the glycerol from the first mixture, the fatty acid alkyl esters and the glycerol of the first mixture may be separated to produce the second mixture, which may be the modified mixture. Initially, the first mixture may be allowed to stay in static conditions overnight to complete the sedimentation of glycerol and sludge. During the initial settling phase, if some emulsion is formed, for example, due to the presence of some emulsion forming byproducts in the ester layer, the emulsion can be broken by heating the first mixture or adding an acidic solution, such as acetic acid, to the first mixture in order to break and prevent emulsion formation. After complete sedimentation, the top clear esterified oil (that is, the alkyl esters) may be decanted slowly and washed for several hours using water while stirring. After washing, the separated oil phase (that is, the second mixture) may be decanted slowly to remove it from the aqueous phase resulting from the water used for washing. The process of washing may be repeated two or more times. The separation of the first mixture may result in the removal of at least 99 wt. % of the glycerol from the first mixture. For example, the separation of the first mixture may result in the removal of at least 99.1 wt. %, at least 99.2 wt. %, at least 99.3 wt. %, at least 99.4 wt. %, at least 99.5 wt. %, at least 99.6 wt. %, at least 99.7 wt. %, at least 99.8 wt. %, or at least 99.9 wt. % of the glycerol from the first mixture.

After removal of the glycerol, any water and short-chain alcohols present in the second mixture may be removed to produce a third mixture, which may be the modified mixture. For example, to remove water and short-chain alcohols from the second mixture, the second mixture may be heated to a temperature sufficient to evaporate the water and short-chain alcohols while the fatty acid alkyl esters remain in a solid or liquid state to produce the third mixture. For example, a second mixture comprising water, methanol, and fatty acid alkyl esters may be heated to 100° C. under dynamic conditions (such as, constant stirring) to evaporate and remove the water and methanol, both of which have a boiling point less than or equal to 100° C., from the second mixture. The heating of the second mixture may result in the removal of at least 99 wt. % of the water and short-chain alcohols from the second mixture. For example, the heating of the second mixture may result in the removal of at least 99.1 wt. %, at least 99.2 wt. %, at least 99.3 wt. %, at least 99.4 wt. %, at least 99.5 wt. %, at least 99.6 wt. %, at least 99.7 wt. %, at least 99.8 wt. %, or at least 99.9 wt. % of the water and short-chain alcohols from the second mixture.

After the removal of one or more of the glycerol, water, and short-chain alcohols, the fatty acid alkyl esters of the modified mixture may be hydrolyzed with a base to produce an emulsifier comprising salts of one or more fatty acids, commonly referred to as soaps. In particular, hydrolyzation of a fatty acid alkyl ester with a base comprises the cleaving of the fatty acid alkyl ester via reaction with an aqueous hydroxide solution to produce a salt of the fatty acid and an alcohol. For example, the methyl ester of palmitic acid may be cleaved via reaction with aqueous calcium hydroxide to produce calcium palmitate (the calcium salt of palmitic acid) and methanol. Accordingly, the fatty acid alkyl esters of the third mixture may be hydrolyzed with a base to produce an emulsifier comprising the salts corresponding to the fatty acids of the fatty acid alkyl esters. To do so, for example, the third mixture may be heated to under dynamic conditions followed by the addition of a material including a divalent cation, such as calcium hydroxide, capable of reacting with the fatty acid alkyl esters of the modified mixture. After the mixture has been heated and stirred for a time sufficient to complete the hydrolyzation, the reaction mixture may be allowed to cool and the resulting suspension may be collected and used as the emulsifier.

The drilling fluids of the present disclosure may comprise the emulsifier in an amount sufficient to facilitate the formation of an emulsion. In embodiments, the drilling fluids of the present disclosure may comprise an emulsifier in an amount of from 0.1 wt. % to 10 wt. %, based on the total weight of the drilling fluid. For example, the drilling fluids of the present disclosure may comprise an emulsifier in an amount of from 0.1 wt. % to 9 wt. %, from 0.1 wt. % to 8 wt. %, from 0.1 wt. % to 7 wt. %, from 0.1 wt. % to 6 wt. %, from 0.1 wt. % to 5 wt. %, from 0.1 wt. % to 4 wt. %, from 0.1 wt. % to 3 wt. %, from 0.1 wt. % to 2 wt. %, from 2 wt. % to 10 wt. %, from 2 wt. % to 9 wt. %, from 2 wt. % to 8 wt. %, from 2 wt. % to 7 wt. %, from 2 wt. % to 6 wt. %, from 2 wt. % to 5 wt. %, from 2 wt. % to 4 wt. %, from 2 wt. % to 3 wt. %, from 3 wt. % to 10 wt. %, from 3 wt. % to 9 wt. %, from 3 wt. % to 8 wt. %, from 3 wt. % to 7 wt. %, from 3 wt. % to 6 wt. %, from 3 wt. % to 5 wt. %, from 3 wt. % to 4 wt. %, from 4 wt. % to 10 wt. %, from 4 wt. % to 9 wt. %, from 4 wt. % to 8 wt. %, from 4 wt. % to 7 wt. %, from 4 wt. % to 6 wt. %, from 4 wt. % to 5 wt. %, from 5 wt. % to 10 wt. %, from 5 wt. % to 9 wt. %, from 5 wt. % to 8 wt. %, from 5 wt. % to 7 wt. %, from 5 wt. % to 6 wt. %, from 6 wt. % to 10 wt. %, from 6 wt. % to 9 wt. %, from 6 wt. % to 8 wt. %, from 6 wt. % to 7 wt. %, from 7 wt. % to 10 wt. %, from 7 wt. % to 9 wt. %, from 7 wt. % to 8 wt. %, from 8 wt. % to 10 wt. %, from 8 wt. % to 9 wt. %, or from 9 wt. % to 10 wt. %, based on the total weight of the drilling fluid. When the drilling fluids comprises the emulsifier in an amount less than, for example, 0.1 wt. % based on the total weight of the drilling fluid, the drilling fluid may not be stable enough for the dispersed phase of the drilling fluid to remain dispersed throughout the continuous phase of the drilling fluid during operation.

The drilling fluids of the present disclosure may be formulated to have specific characteristics, such as increased viscosity and density. For example, the drilling fluids may be formulated to have a density in a range suitable to provide the necessary hydrostatic pressure to support the sidewalls of the wellbore and prevent fluids in the formation from flowing into the wellbore. Additionally, the drilling fluids may be formulated to have viscosity in a range suitable to allow the drilling fluids to be pumped down through the drill string while still capturing and conveying cuttings from the bottom of the subterranean formation. To accomplish these functions, the drilling fluids may include one or more additives that are suitable for use in drilling fluids. The one or more additives may include alkalinity adjusters, viscosifiers, shale inhibitors, fluid loss control agents, weighting agents, or combinations of these. In embodiments, the drilling fluid may comprise one or more additives in an amount of from 0.1 wt. % to 75 wt. %, based on the total weight of the drilling fluid. For example, the drilling fluid may comprise one or more additives in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid.

As stated previously, the drilling fluid of the present disclosure may comprise an alkalinity adjuster. Alkalinity adjusters may comprise alkaline compounds that may be included in drilling fluids to buffer the pH of the drilling fluid. Alkalinity adjusters may react with gases, such as carbon dioxide or hydrogen sulfide, encountered by the drilling fluid during drilling operations to prevent the gases from hydrolyzing components of the drilling fluid. Suitable alkalinity adjusters may comprise lime (calcium hydroxide or calcium oxide), soda ash (sodium carbonate), sodium hydroxide, potassium hydroxide, or combinations of these. The drilling fluid may comprise an alkalinity adjuster in an amount sufficient to adjust the pH of the drilling fluid to a desired level. In embodiments, the drilling fluid may comprise an alkalinity adjuster in an amount of from 0.1 wt. % to 75 wt. %, based on the total weight of the drilling fluid. For example, the drilling fluid may comprise an alkalinity adjuster in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid.

As stated previously, the drilling fluid of the present disclosure may comprise a viscosifier, also referred to as a rheology modifier. Viscosifiers may impart non-Newtonian fluid rheology to the drilling fluid, create a flat viscosity profile of the drilling fluid in annular flow, or both. This may facilitate the lifting and conveying of cuttings from the bottom of the subterranean formation to the surface during drilling of the subterranean well. Suitable viscosifiers may comprise polysaccharides, bentonite, polyacrylamides, polyanionic cellulose, or combinations of these. For example, the viscosifier may comprise xanthan gum, a polysaccharide also referred to as "XC polymer." The drilling fluid may comprise a viscosifier in an amount sufficient to impart non-Newtonian fluid rheology to the drilling fluid, create a flat viscosity profile of the drilling fluid in annular flow, or both. In embodiments, the drilling fluid may comprise a viscosifier in an amount of from 0.1 wt. % to 75 wt. %, based on the total weight of the drilling fluid. For example, the drilling fluid may comprise a viscosifier in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid. In instances where a polymer-based viscosifier is used, the drilling fluid may further comprise a thermal stabilizer, such as sodium sulfite, which may prevent the thermal degradation of the viscosifier at increased temperatures, such as those downhole of the wellbore. In embodiments, the drilling fluid may comprise a thermal stabilizer in an amount of from 0.1 wt. % to 10 wt. %, based on the total weight of the drilling fluid. For example, the drilling fluid may comprise a thermal stabilizer in an amount of from 0.1 wt. % to 8 wt. %, from 0.1 wt. % to 6 wt. %, from 0.1 wt. % to 4 wt. % from 0.1 wt. % to 2 wt. %, from 2 wt. % to 10 wt. %, from 2 wt. % to 8 wt. %, from 2 wt. % to 6 wt. %, from 2 wt. % to 4 wt. %, from 4 wt. % to 10 wt. %, from 4 wt. % to 8 wt. %, from 4 wt. % to 6 wt. %, from 6 wt. % to 10 wt. %, from 6 wt. % to 8 wt. %, or from 8 wt. % to 10 wt. %, based on the total weight of the drilling fluid.

As stated previously, the drilling fluid of the present disclosure may comprise a shale inhibitor. Shale inhibitors, also referred to as clay stabilizers or swelling inhibitors, may prevent the swelling and hydration of water-sensitive subterranean formation, such as shale formations. Shale inhibitors may attach to the surface of the subterranean formation and lend stability to the formation exposed to the drilling fluid as well as prevent cuttings from dispersing into finer particles. Suitable shale inhibitors may comprise sodium chloride, potassium chloride, potassium carbonate, potassium lignite, calcium chloride, sodium asphalt sulfonate (commercially available as SOLTEX® from Chevron Phillips Chemical Company), or combinations of these. The drilling fluid may comprise a shale inhibitor in an amount sufficient to prevent the swelling and hydration of the subterranean formation. In embodiments, the drilling fluid may comprise a shale inhibitor in an amount of from 0.1 wt. % to 75 wt. %, based on the total weight of the drilling fluid. For example, the drilling fluid may comprise a shale inhibitor in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid.

As stated previously in the present disclosure, the drilling fluid of the present disclosure may comprise a fluid loss control agent. Fluid loss control agents may reduce or prevent the leakage of the liquid phase of the drilling fluid into the subterranean formation. This leakage may result in an undesirable buildup of solid material present in the drilling fluid, damage to the subterranean formation, or both. Suitable fluid loss control agents may include starch, carboxymethyl starch, carboxymethylcellulose, sodium asphalt sulfonate (commercially available as SOLTEX® from Chevron Phillips Chemical Company), or combinations of these. The drilling fluid may comprise a fluid loss control agent in an amount sufficient to reduce or prevent the leakage of the liquid phase of the drilling fluid into the subterranean formation. In embodiments, the drilling fluid may comprise a fluid loss control agent in an amount of from 0.1 wt. % to 75 wt. %, based on the total weight of the drilling fluid. For example, the drilling fluid may comprise a fluid loss control in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid.

As stated previously, the drilling fluid of the present disclosure may comprise a weighting agent. Weighting agents may include finely divided solid particles that may be dispersed in the drilling fluid. Weighting agents may increase the density of the drilling fluid to support the sidewalls of the wellbore. Weighting agents may also increase the hydrostatic pressure of the drilling fluid to reduce or prevent fluids present in the subterranean formation from flowing into the wellbore. Suitable weighting agents may comprise barite, hematite, calcium carbonate, siderite, ilmenite, or combinations of these. In embodiments, the drilling fluid may comprise a weighting agent in an amount sufficient for the drilling fluid to achieve a density of from 50 pounds per cubic foot (pcf) to 150 pcf, as measured in accordance with the American Petroleum Institute (API) recommended practice 13B-1. For example, the drilling fluid may comprise a weighting agent in an amount sufficient for the drilling fluid to achieve a density of from 50 pcf to 125 pcf, from 50 pcf to 100 pcf, from 50 pcf to 75 pcf, from 75 pcf to 150 pcf, from 75 pcf to 125 pcf, from 75 pcf to 100 pcf, from 100 pcf to 150 pcf, from 100 pcf to 125 pcf, or from 125 pcf to 150 pcf. In embodiments, the drilling fluid may include a weighting agent in an amount of from 0.1 wt. % to 75 wt. %, based on the total weight of the drilling fluid. For example, the drilling fluid may comprise a weighting agent in an amount of from 0.1 wt. % to 60 wt. %, from 0.1 wt. % to 45 wt. %, from 0.1 wt. % to 30 wt. % from 0.1 wt. % to 15 wt. %, from 15 wt. % to 75 wt. %, from 15 wt. % to 60 wt. %, from 15 wt. % to 45 wt. %, from 15 wt. % to 30 wt. %, from 30 wt. % to 75 wt. %, from 30 wt. % to 60 wt. %, from 30 wt. % to 45 wt. %, from 45 wt. % to 75 wt. %, from 45 wt. % to 60 wt. %, or from 60 wt. % to 75 wt. %, based on the total weight of the drilling fluid.

The present disclosure is also directed to the use of the drilling fluid in drilling operations, such as drilling a subterranean well. Accordingly, methods for drilling a subterranean well may include operating a drill in a subterranean formation in the presence of a drilling fluid. The drilling fluid may be in accordance with any of the embodiments previously described. In embodiments, the drilling fluid may be introduced into the subterranean formation. Introducing may involve injecting the drilling fluid into the subterranean formation. In embodiments, the drilling fluid may be injected through a drill string of the drill to a drill bit. In embodiments, the subterranean formation may be a subterranean well. In embodiments, the subterranean formation may be a shale formation. The drilling fluid may at least be partially circulated within the subterranean formation. Recirculating the drilling fluid may allow the drilling fluid to cool and lubricate the drill bit and to lift cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

Further embodiments of the present disclosure may relate to particular methods of preparing the drilling fluid. The method may include preparing the emulsifier as described previously in the present disclosure. The method may also include mixing the emulsifier with a base drilling fluid. The base drilling fluid may comprise the aqueous phase and the non-aqueous phase, as described previously in the present disclosure.

EXAMPLES

The various embodiments of the present disclosure will be further clarified by the following examples. The examples are illustrative in nature, and should not be understood to limit the subject matter of the present disclosure.

Example 1

In Example 1, various properties of two emulsion drilling fluids, one including an emulsifier prepared according to the present application and one including a commercially available emulsifier (INVERMUL®, commercially available from Halliburton Company), were determined. After preparing the two emulsion drilling fluids, each emulsion drilling fluid was hot rolled for 16 hours at 300 degrees Fahrenheit (° F.) and 500 pounds per square inch (psi) prior to the determination of any properties. The formulations and select properties of both emulsion drilling fluids are provided in Table 1.

TABLE 1

|  | Sample 1 | Comparative Sample 1 |
| --- | --- | --- |
| Formulation | | |
| Safra Oil (mL) | 218 | 218 |
| INVERMUL ® (mL) | — | 12 |
| Emulsifier of the Present Application (mL) | 12 | — |
| EZ MUL ® (mL) (commercially available from Halliburton Company) | 4 | 4 |
| Lime (g) | 6 | 6 |
| GELTONE ® (g) (commercially available from Halliburton Company) | 4 | 4 |
| DURATONE ® (g) (commercially available from Halliburton Company) | 6 | 6 |

TABLE 1-continued

|  | Sample 1 | Comparative Sample 1 |
|---|---|---|
| Brine (mL) (61 g CaCl$_2$ in 85 cc H$_2$O) | 85 | 85 |
| Barite (g) | 161 | 161 |
| Properties | | |
| Plastic Viscosity (cP) | — | 22.9 |
| Yield Point (lb/100 ft$^2$) | — | 9.2 |
| API Spurt Loss (mL) | 0 | 0 |
| API Fluid Loss (mL) | 0 | 0 |
| HPHT Spurt Loss (mL) (300° F., 500 psi) | 0 | 0.4 |
| HPHT Fluid Loss (mL) (300° F., 500 psi) | 5 | 5.6 |

As shown by Table 1, Sample 1 had a significantly greater plastic viscosity and yield point than Comparative Sample 1. Indeed, Sample 1 was determined to be too viscous to accurately determine plastic viscosity and yield point after hot rolling. Sample 1 had an improved spurt loss and fluid loss under "high pressure and high temperature" (HPHT) conditions compared to Comparative Sample 1. Spurt loss is a measurement of the instantaneous volume, or "spurt," of liquid that passes through a filter medium prior to deposition of a competent and controlling filter cake. A "competent" filter cake is one that maintains its original thickness during deformation. Fluid loss is a measurement of the static filtration behavior of the emulsion drilling fluid at a given temperature and pressure. Therefore, Table 1 indicates an emulsion drilling fluid that includes the emulsifier of the present application may have improved spurt and fluid loss properties.

Example 2

In Example 2, various properties of two emulsion drilling fluids, one including an emulsifier prepared according to the present application and one including no primary emulsifier, were determined. After preparing the two emulsion drilling fluids, each emulsion drilling fluid was hot rolled for 16 hours at 300 degrees Fahrenheit (° F.) and 500 pounds per square inch (psi) prior to the determination of any properties. The formulations and select properties of both emulsion drilling fluids are provided in Table 2.

TABLE 2

|  | Sample 2 | Comparative Sample 2 |
|---|---|---|
| Formulation | | |
| Safra Oil (mL) | 218 | 218 |
| Emulsifier of the Present Application (mL) | 6 | - |
| EZ MUL ® (mL) | 4 | 4 |
| Lime (g) | 6 | 6 |
| GELTONE ® (g) | 4 | 4 |
| DURATONE ® (g) | 6 | 6 |
| Brine (mL) (61 g CaCl$_2$ in 85 cc H$_2$O) | 85 | 85 |
| Barite (g) | 161 | 161 |
| Properties | | |
| Plastic Viscosity (cP) | 28 | 32 |
| Yield Point (lb/100 ft$^2$) | 32 | 32 |
| API Spurt Loss (mL) | 0 | 0 |

TABLE 2-continued

|  | Sample 2 | Comparative Sample 2 |
|---|---|---|
| API Fluid Loss (mL) | 0 | 1 |
| HPHT Spurt Loss (mL) (300° F., 500 psi) | 4 | 6 |
| HPHT Fluid Loss (mL) (300° F., 500 psi) | 10 | 22 |

As shown by Table 2, Sample 2 had an improved spurt loss and fluid loss under HPHT conditions compared to Comparative Sample 2. However, most importantly, it is noted that Comparative Sample 2 exhibited oil-water phase separation in the collected filtrate, whereas the brine of Sample 2 (that is, the dispersed phase of the emulsion) remained dispersed within the oil of Sample 2 (that is, the continuous phase of the emulsion). That is, Table 2 again indicates an emulsion drilling fluid that includes the emulsifier of the present application may have improved spurt and fluid loss properties, and indicates an emulsion drilling fluid that includes the emulsifier of the present application may have improved stability under HPHT conditions, such as those encountered when drilling a well to access a subterranean formation.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

It should now be understood that various aspects of the present disclosure are described and such aspects may be utilized in conjunction with various other aspects.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in the present disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A method for producing an emulsifier suitable for use in an emulsion drilling fluid, the method comprising:
   esterifying a processed vegetable oil to produce a first mixture comprising fatty acid alkyl esters, wherein the processed vegetable oil comprises less than 1 wt. % of compounds having an atmospheric boiling point less than or equal to 150° C.;
   removing at least 99 wt. % of each of glycerol, water, and short-chain alcohols from the first mixture to produce a modified mixture, wherein short-chain alcohols are alcohols having a main chain of less than or equal to 12 carbon atoms; and hydrolyzing the fatty acid alkyl esters of the modified mixture with a base to produce the emulsifier comprising at least one salt of a fatty acid, wherein the processed vegetable oil comprises less than 1 wt. % of 2,4-decadienal, 1-octen-3-ol, 2-penten-1-ol, nonanal, hexanal, heptanal, and 2-4,decadieanal, based on the total weight of the processed vegetable oil.

2. The method of claim 1, wherein the processed vegetable oil is a previously unprocessed vegetable oil that was used in a food preparation process.

3. The method of claim 1, wherein the processed vegetable oil is esterified with a short-chain alcohol in the presence of a catalyst.

4. The method of claim 3, wherein the processed vegetable oil is esterified with methanol in the presence of sodium hydroxide.

5. The method of claim 1, wherein the fatty acid alkyl esters of the modified mixture are hydrolyzed by reaction with an aqueous hydroxide solution.

6. A method for producing an emulsion drilling fluid, the method comprising:

esterifying a processed vegetable oil to produce a first mixture comprising fatty acid alkyl esters, wherein the processed vegetable oil comprises less than 1 wt. % of compounds having an atmospheric boiling point less than or equal to 150° C.;

removing at least 99 wt. % of each of glycerol, water, and short-chain alcohols from the first mixture to produce a modified mixture, wherein short-chain alcohols are alcohols having a main chain of less than or equal to 12 carbon atoms;

hydrolyzing the fatty acid alkyl esters of the modified mixture with a base to produce an emulsifier comprising at least one salt of a fatty acid; and mixing the emulsifier with a base drilling fluid comprising an aqueous phase and a non-aqueous phase to produce the emulsion drilling fluid, wherein the processed vegetable oil comprises less than 1 wt. % of 2,4-decadienal, 1-octen-3-ol, 2-penten-1-ol, nonanal, hexanal, heptanal, and 2-4,decadieanal, based on the total weight of the processed vegetable oil.

7. The method of claim 6, wherein the processed vegetable oil is a previously unprocessed vegetable oil that was used in a food preparation process.

8. The method of claim 6, wherein the processed vegetable oil is esterified with a short-chain alcohol in the presence of a catalyst.

9. The method of claim 8, wherein the processed vegetable oil is esterified with methanol in the presence of sodium hydroxide.

10. The method of claim 6, wherein the fatty acid alkyl esters of the third mixture are hydrolyzed by reaction with an aqueous hydroxide solution.

11. The method of claim 6, wherein the aqueous phase comprises an aqueous base fluid and the non-aqueous phase comprises a non-aqueous base fluid.

12. An emulsion drilling fluid comprising:

an aqueous phase comprising an aqueous base fluid in an amount of from 5 wt. % to 95 wt. %, based on the total weight of the emulsion drilling fluid;

a non-aqueous phase comprising a non-aqueous base fluid in an amount of from 5 wt. % to 95 wt. %, based on the total weight of the emulsion drilling fluid; and an emulsifier in an amount of from 0.1 wt. % to 10 wt. %, based on the total weight of the emulsion drilling fluid, wherein the emulsifier is produced by a method comprising:

esterifying a processed vegetable oil to produce a first mixture comprising fatty acid alkyl esters, wherein the processed vegetable oil comprises less than 1 wt. % of compounds having an atmospheric boiling point less than or equal to 150° C., wherein the processed vegetable oil comprises less than 1 wt. % of 2,4-decadienal, 1-octen-3-ol, 2-penten-1-ol, nonanal, hexanal, heptanal, and 2-4,decadieanal, based on the total weight of the processed vegetable oil;

removing at least 99 wt. % of each of glycerol, water, and short-chain alcohols from the first mixture to produce a modified mixture, wherein short-chain alcohols are alcohols having a main chain of less than or equal to 12 carbon atoms; and hydrolyzing the fatty acid alkyl esters of the modified mixture with a base to produce the emulsifier comprising at least one salt of a fatty acid.

13. The emulsion drilling fluid of claim 12, wherein the processed vegetable oil is esterified with a short chain alcohol in the presence of a catalyst.

14. The emulsion drilling fluid of claim 13, wherein the processed vegetable oil is esterified with methanol in the presence of sodium hydroxide.

15. The emulsion drilling fluid of claim 12, wherein the fatty acid alkyl esters of the third mixture are hydrolyzed by reaction with an aqueous hydroxide solution.

16. The emulsion drilling fluid of claim 12, wherein the emulsion drilling fluid is a direct emulsion and comprises:

the aqueous base fluid in an amount of from 50 wt. % to 95 wt. %, based on the total weight of the emulsion drilling fluid; and the non-aqueous base fluid in an amount of from 5 wt. % to 50 wt. %, based on the total weight of the emulsion drilling fluid.

17. The emulsion drilling fluid of claim 12, wherein the emulsion drilling fluid is an invert emulsion and comprises:

the aqueous base fluid in an amount of from 5 wt. % to 50 wt. %, based on the total weight of the emulsion drilling fluid; and the non-aqueous base fluid in an amount of from 50 wt. % to 95 wt. %, based on the total weight of the emulsion drilling fluid.

18. The emulsion drilling fluid of claim 12, further comprising one or more additives in an amount of from 0.1 wt. % to 75 wt. %.

* * * * *